B. GOODRICH & G. M. TURNER.
Pan-Lifters.

No. 156,563. Patented Nov. 3, 1874.

Witnesses.
C. F. Brown
M. Church

Inventors
B. Goodrich
G. M. Turner
by their Attys.
Dice & Ellsworth

UNITED STATES PATENT OFFICE.

BARTHOLOMEW GOODRICH, OF NORFOLK, AND GEORGE M. TURNER, OF PORTSMOUTH, VIRGINIA.

IMPROVEMENT IN PAN-LIFTERS.

Specification forming part of Letters Patent No. 156,563, dated November 3, 1874; application filed September 4, 1874.

*To all whom it may concern:*

Be it known that we, BARTHOLOMEW GOODRICH, of Norfolk, and GEORGE M. TURNER, of Portsmouth, both in the county of Norfolk and State of Virginia, have invented a new and useful Holder for Pans; and we do hereby declare the following to be a full and exact description of the same, reference being had to the accompanying drawings, forming part of this specification, in which—

Figure 1:
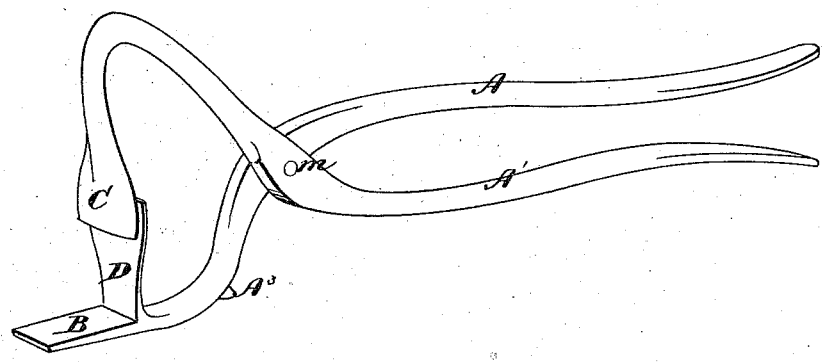
Figure 2:
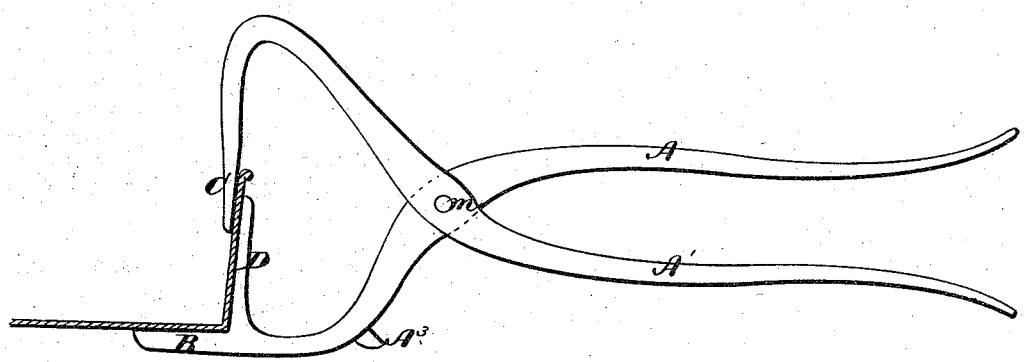

Figure 1 represents a perspective view, and Fig. 2 a side elevation.

Similar letters of reference in the accompanying drawings denote the same parts.

The object of our invention is to provide for public use an improved holder for pans, for the purpose of readily removing them from the ovens of stoves or similar places and depositing them where desired, which we will now proceed to describe.

In the accompanying drawings, A A$^1$ are the handles of my improved implement, pivoted at $m$. The handle A is curved downward beyond the pivotal point $m$ a short distance, and thence proceeds in a horizontal direction, being flattened and widened to form the support B for the bottom of the pan to be removed. D is the jaw of the handle A, making an obtuse angle with the support B. A$^3$ is a hook or projection on the lower end of the handle A, which, in operation, is brought over the upper edge of the pan to draw the latter to the front of the oven before applying the implement to the pan to be removed. The handle A$^1$ is curved upward beyond the pivotal point $m$ a short distance, and is then bent vertically downward and flattened to form a jaw, as seen at C, and projects over the upper end of the jaw D, leaving a slight space between them, so as to clasp the upper edge of the pan to be removed. The edges of the jaw D are preferably beveled.

The operation of my improved holder is as follows: The pan is first drawn to the front of the oven, or other receptacle from which it is desired to remove it, by means of the hook or projection A$^3$. The supporting-arm B is then placed under the bottom of the pan, the outer side of the latter resting against the jaw D, when the jaw C is closed, the jaws C and D thus securely clasping the side of the pan, and its bottom resting on the support B, when it can readily be removed to any desired place.

The holder can also be used as a stove-plate lifter by inserting the end B into the recess of the stove-plate.

I claim as new—

The pan-lifter herein described, consisting of the curved handles A A$^1$, pivoted at $m$, the upper handle A having the horizontal support B and inclined jaw D, and the lower handle A$^1$ being provided with the jaw C, and the jaws closing beyond each other, so as to form opposite bearing-surfaces for the side of the pan to be lifted, substantially as described.

BARTHOLOMEW GOODRICH.
GEORGE M. TURNER.

Witnesses:
EDWARD SPALDING,
C. R. TURNER.